United States Patent [19]

Hehl

[11] Patent Number: 5,129,816
[45] Date of Patent: Jul. 14, 1992

[54] PLASTICIZING AND INJECTION UNIT FOR USE IN AN INJECTION MOLDING MACHINE

[76] Inventor: Karl Hehl, Arthur-Hehl-Strasse 32, W-7298 Lossburg, Fed. Rep. of Germany

[21] Appl. No.: 694,908

[22] Filed: May 2, 1991

[30] Foreign Application Priority Data

May 4, 1990 [DE] Fed. Rep. of Germany ....... 4014311

[51] Int. Cl.⁵ ................ B29C 45/07; B29C 45/62
[52] U.S. Cl. .................................... 425/542; 425/190
[58] Field of Search ............... 425/574, 587, 190, 191, 425/542

[56] References Cited

U.S. PATENT DOCUMENTS

| | | | |
|---|---|---|---|
| 4,731,005 | 3/1988 | Hehl | 425/542 |
| 4,753,589 | 6/1988 | Hehl | 425/542 |
| 4,850,841 | 7/1989 | Hehl | 425/190 |

Primary Examiner—Willard Hoag
Attorney, Agent, or Firm—Spencer, Frank & Schneider

[57] ABSTRACT

The plasticizing and injecting unit comprises at least one hydraulic advance-retract actuator that is provided with external screw threads, which are screwed into internal screw threads of a bore formed in a carrier and supply block. Means for locking the advance-retract actuator in the bore in that the interengaging screw threads are wedged against each other comprise a plurality of lock screws, which are parallel to the injection axis and disposed on a circle that surrounds the bore in which the actuator is received. The screws can be tightened to different degrees so that the carrier and supply block and the advance-retract actuator are biased in mutually opposite senses and any deviations from a coaxial arrangement of the interengaging screw threads can thus arbitrarily be changed in its magnitude and direction. As a result, the stresses which result in the overall structure from a deviation from a coaxial arrangement can be minimized by a simple manipulation.

10 Claims, 7 Drawing Sheets

PLASTICIZING AND INJECTION UNIT FOR USE IN AN INJECTION MOLDING MACHINE

BACKGROUND OF THE INVENTION

1. Field of the Invention

This invention relates to a plasticizing and injecting unit for use in an injection molding machine, comprising a carrier and supply block, a plasticizing cylinder detachably mounted in the carrier and supply block, which is formed with at least one tapped bore that is parallel to the injection axis, and at least one cylindrical hydraulic actuator, which is received in said bore and has external screw threads engaging the internal screw threads of said bore, wherein an angular misalignment may occur between the axis of the actuator and the axis of the bore under the influence of a misaligning moment and means are provided for locking the actuator unit in the bore and comprise at least one locking screw for weding the internal and external screw threads against each other to lock the actuator in the bore.

2. Description of the Prior Art

A known plasticizing and injecting unit of that kind is disclosed in U.S. Pat. No. 4,850,841. In that known unit a vertical slot is formed in the carrier and supply block between the bores of any pair of bores disposed one over the other and the width of that slot can slightly be decreased by means of a horizontal clamp screw so that the carrier and supply block is reversibly deformed adjacent to the slot. For this reason the hydraulic actuators received in the bores can axially be fixed in that the screw threads are wedged against each other. But a relatively heavy implement is required to tighten the clamp screw. Before that fixation the cylinders of the hydraulic actuators are usually in a position which differs from a coaxial position on the center lines of the associated bores but slightly deviate from such coaxial position. Said deviations will remain between the limits which are defined by the backlash between the internal screw threads of the bores and the external screw threads of the cylinders and are also caused by relatively strong misaligning moments, which are due to the fact that the internal and external screw threads establish a connection between units which have centers of gravity which are disposed in front of and behind the screw threads, respectively, at a considerable distance from the screw threads. A subassembly consisting of the carrier and supply block and the plasticizing cylinder is supported by the internal screw threads of the bores on the external screw threads of the cylinders of the advance-retract actuators for axially displacing the entire injection unit. Another subassembly consists of the injection actuators, a feed screw actuating bridge, which connects said injection actuators on the rear and is provided with a rotary drive, and the feed screw and is virtually suspended from the feed screw actuating bridge by the engagement between the external screw threads of the cylinders of the injection actuators and the internal screw threads of the carrier and supply block. In dependence on the design of the plasticizing and injecting unit the center of gravity of each of said subassemblies may be disposed at different locations so that misaligning moments may arise which in different plasticizing and injecting units may differ in magnitude and also in direction. In any case any deviation from a coaxial arrangement which is present before the screw threads are wedged against each other will be preserved when the screw threads are locked by being wedged against each other. It must be pointed out that even slight deviations of the hydraulic advance-retract actuators for the entire plasticizing and injecting unit from a coaxial arrangement may give rise to considerable stresses in the system owing to the large length of the plasticizing cylinder. Stresses may also be caused by a deviation of the hydraulic injection actuators for axially actuating the feed screw, which latter actuators are fixedly connected to the feed screw actuating bridge and via the bridge to the rotary drive motor for the feed screw. In that case too, even slight deviations of the hydraulic injection actuators for axially actuating the feed screw will tend to change the position of the feed screw at its forward end. Such stresses will arise even if the plasticizing cylinder and/or the carrier and supply block are supported by rolling elements on a pedestal of the injection molding machine and in that case will substantially be effective in the region between the region in which the screw threads engage each other and the means for supporting and guiding the plasticizing cylinder and the carrier and supply block.

On the other hand, the above-mentioned deviations from a coaxial arrangement may be neglected because they virtually do not become apparent during a normal injection molding operation and will not produce substantial results if the plasticizing cylinder is supported and is laterally guided. The direction of the axis of the feed screw is substantially determined by the mounting of the feed screw in the plasticizing cylinder so that the feed screw will not be bent. For these reasons the above-mentioned deviations from a coaxial arrangement will give rise in the overall system of the plasticizing and injecting unit only to stresses which are so small that they are usually not detected. But long-term trial operations have revealed that such stresses do influence the life of the operating units and members concerned and particularly of the feed screw. Even a very slight bending occurring in the plasticizing cylinder as a result of a deviation from a coaxial arrangement will result during the rotation of the feed screw to a continual mechanical stressing of the material. Besides, the surfaces of feed screws are often finished to have a brittle consistency so that the durability of such brittle surfaces may adversely be affected considerably by such stresses.

The problem residing in the deviation from a coaxial arrangement will arise wherever a subassembly having external screw threads is received in internal screw threads of a carrying structure and a strong misaligning moment arises.

SUMMARY OF THE INVENTION

In view of the recognition that the life of the equipment will adversely be affected by the long-term effects of stresses arising in the overall structure, it is an object of the invention so to improve a plasticizing and injecting unit of the kind described first hereinbefore that the stresses arising in the overall structure owing to deviations from a coaxial arrangement will be minimized by simple manipulations, which can be performed by means of a portable tool.

That object is accomplished in that the locking means comprises a plurality of lock screws, which are mounted approximately on a circle around the axis of each of said bores and extend approximately parallel to the injection axis and can selectively be tightened so that the carrier and supply block, on the one hand, and the actuator on the other hand are selectively biased in mutually opposite senses so that the angular misalignment can arbitrarily be changed in magnitude and direction.

In such an arrangement the angle between the axis of the external screw threads and the axis of the internal screw threads can arbitrarily be changed by means which involve only a small expenditure of work.

If the units which are interconnected by the screw threads are subjected to a strong misaligning moment, it may not only be necessary to minimize the angular misalignment but to change or increase that angular misalignment by an action which opposes the misaligning moment. In the illustrative embodiment shown by way of example this is particularly applicable to the hydraulic injecting actuators for axially actuating the feed screw, which actuators are strongly biased at the rear by a feed screw actuating bridge, by a rotary motor, and by the feed screw.

The required adjustment of the angular misalignment may be effected in that the several lock screws are consecutively rotated in a tightening or loosening sense to different degrees so that said adjustment will be effected in individual small steps and with an exertion of a relatively small torque by a relatively small force. That fact is of high importance in practive because the assembling workers, particularly if they work outside the manufacturing plant, e.g., when machines are to be installed in the premises of the buyer, and any implement required for such adjustment will have to be carried to the place of use by means of a vehicle if the implements have a heavy weight. Such screwing implements would inevitably be required if the screw threads were to be wedged against each other by means of a lock nut consisting of a tapped ring, as is indicated at 39 in FIGS. 1, 5 and 6. The advantages afforded by a manual handling of the implement used for assembling and servicing will be particularly significant in the installation and servicing of injection molding machines at remote locations, e.g., in third-world countries having poor roads. But in every case said disadvantages will substantially decrease the assembling and servicing costs, particularly if the machines to be attended to are disposed at dispersed locations, which are relatively difficultly accessible.

DETAILED DESCRIPTION OF THE PREFERRED EMBODIMENT

Figure 1:
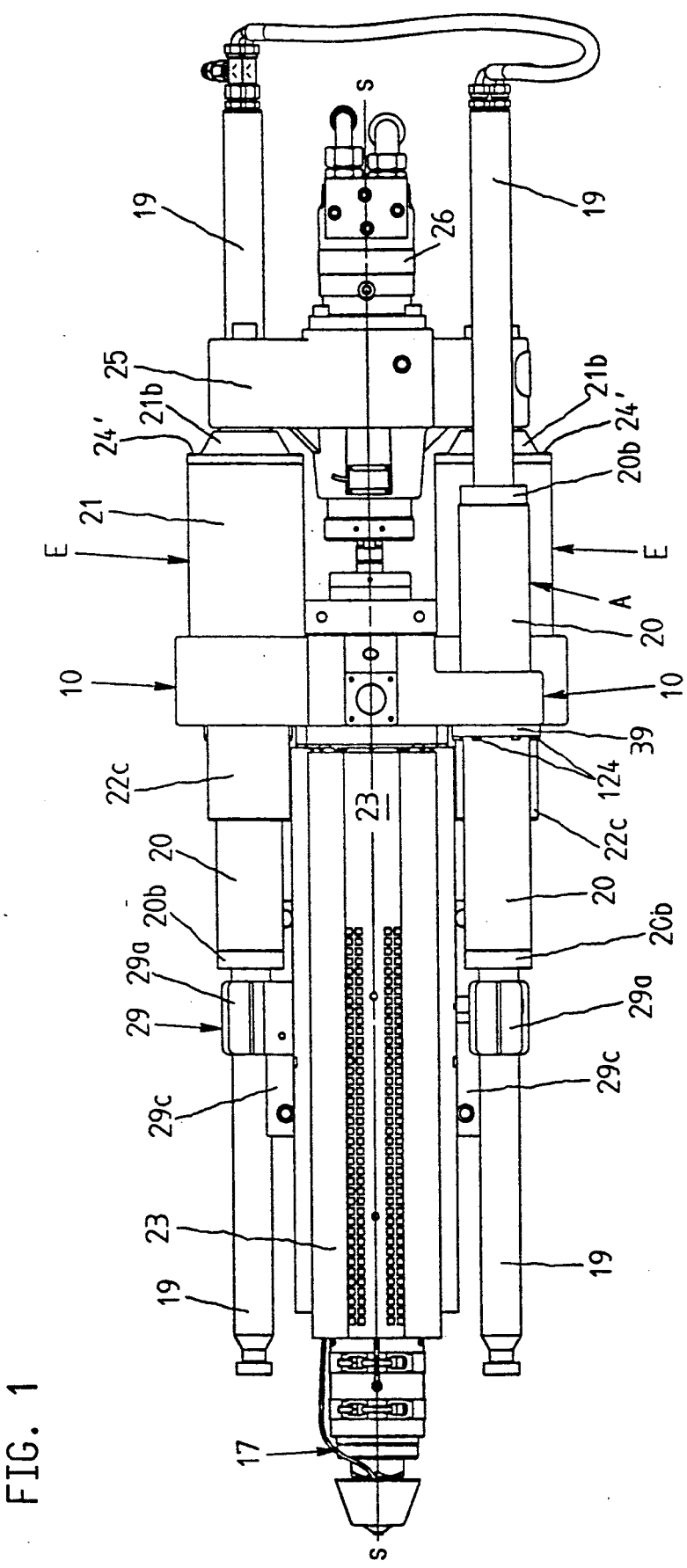
FIGS. 1 and 2 show a plasticizing and injecting unit in a top plan view and in side elevation, respectively.

An illustrative embodiment of the invention will now be described in more detail with reference to the drawing.

Figure 2:
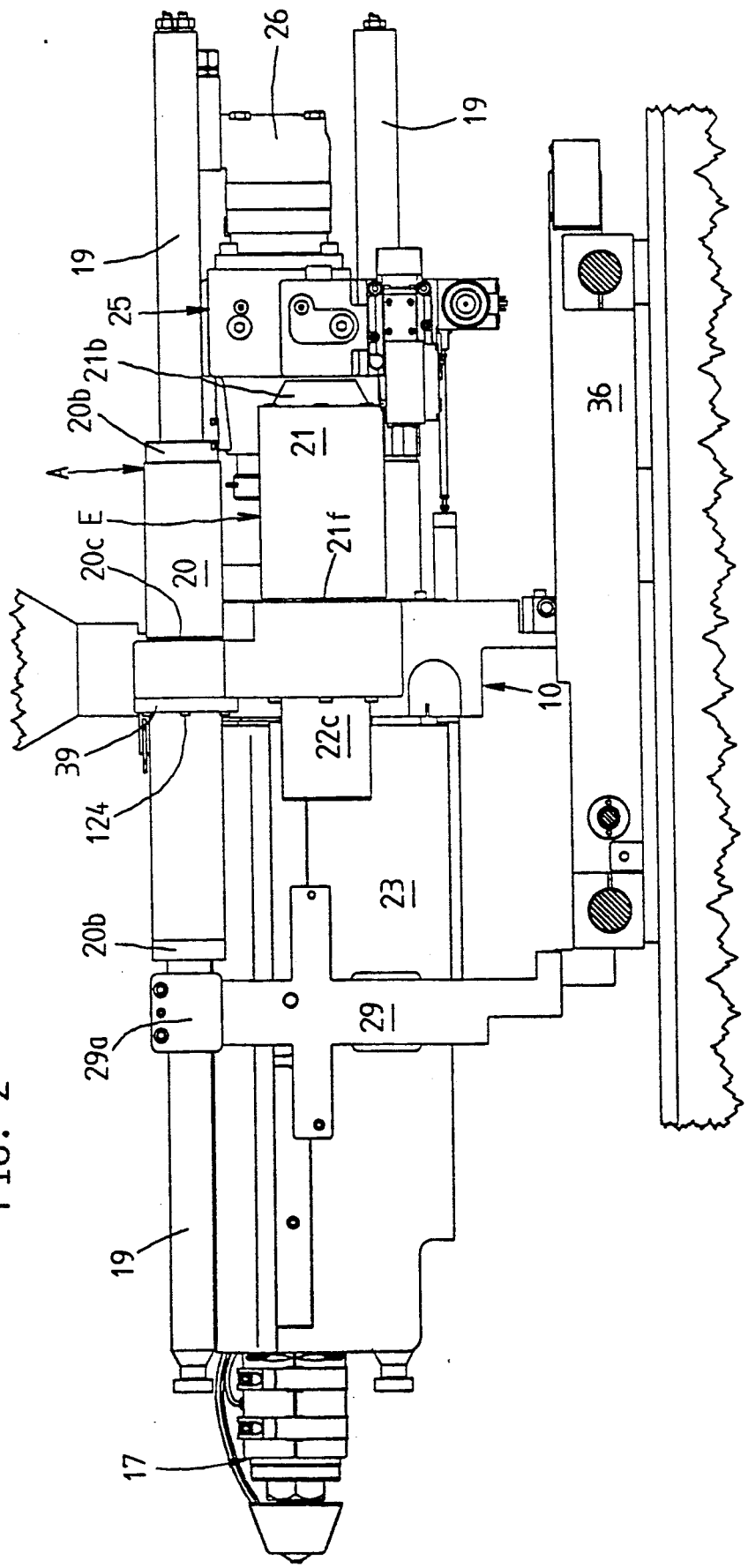
Figure 3:
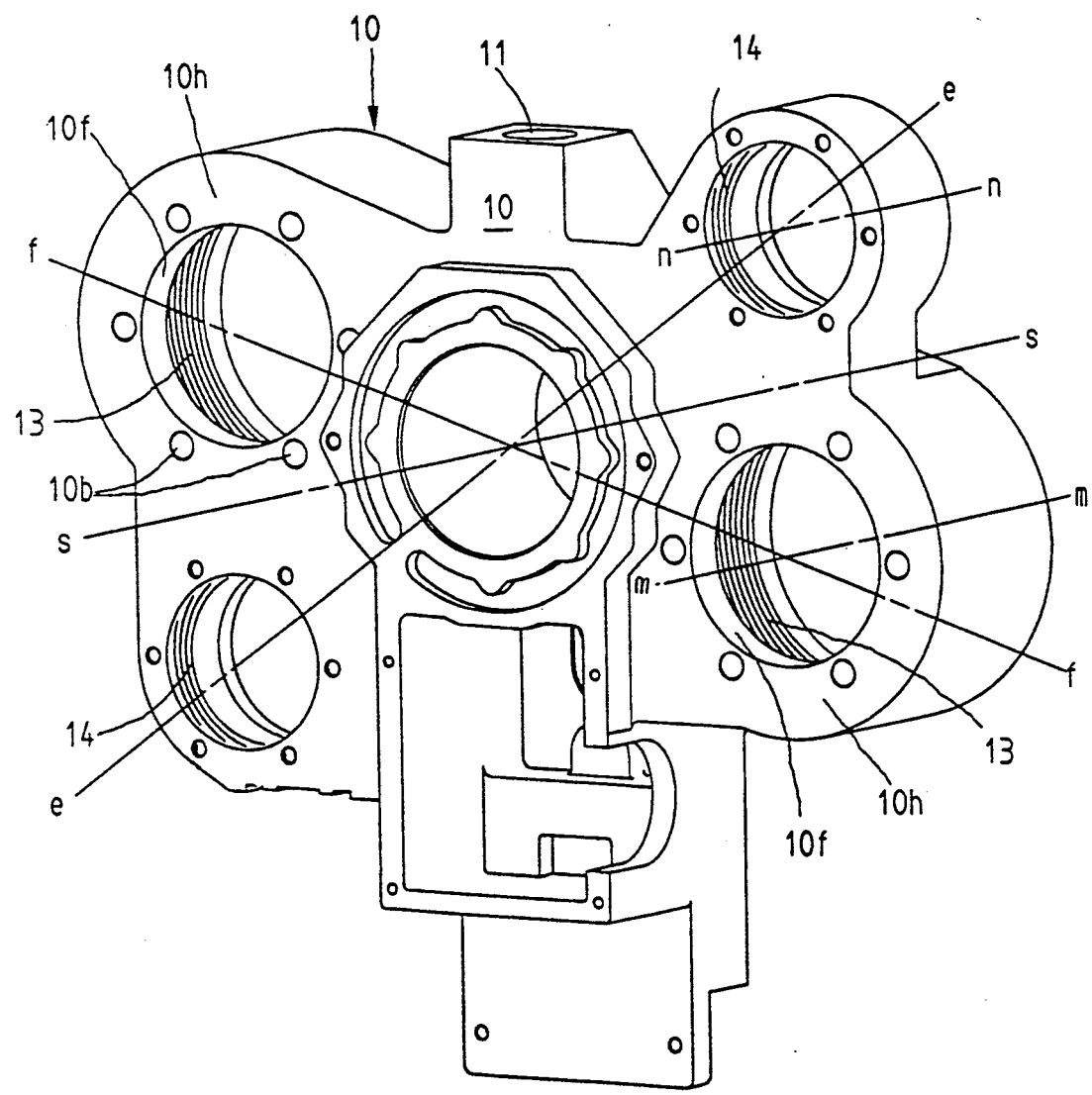
FIG. 3 is a perspective view showing the carrier and supply block of said plasticizing and injecting unit.

FIGS. 1 to 3 illustrate how the features of the invention can be embodied in a plasticizing and injecting unit which is of the type disclosed in U.S. Pat. No. 4,850,841.

Figure 4:
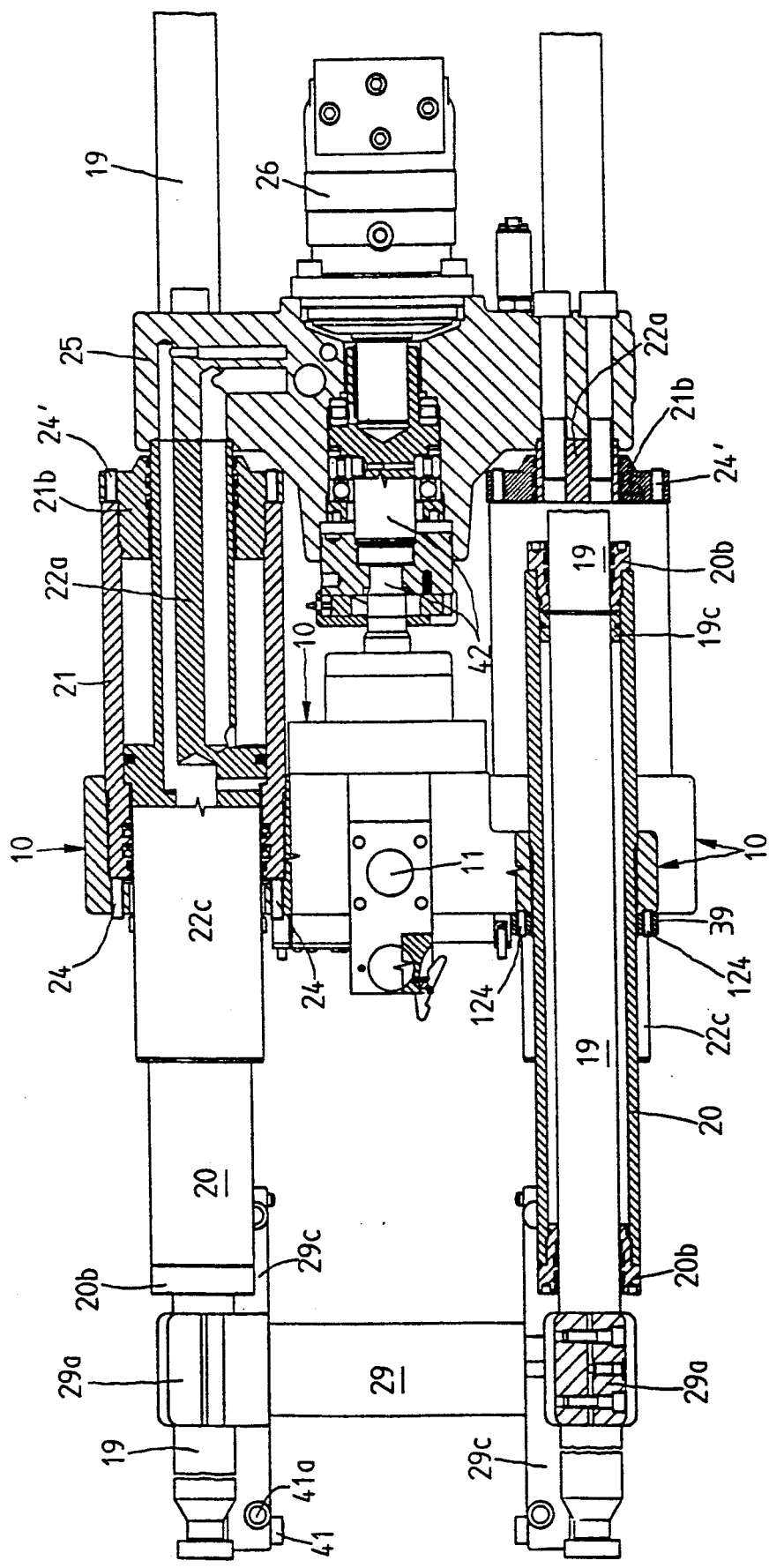
FIG. 4 is a top plan view showing a plasticizing and injecting unit partly in a horizontal sectional view on a plane extending through the upper actuators and with the plasticizing cylinder and the feed screw omitted.
Figure 5:
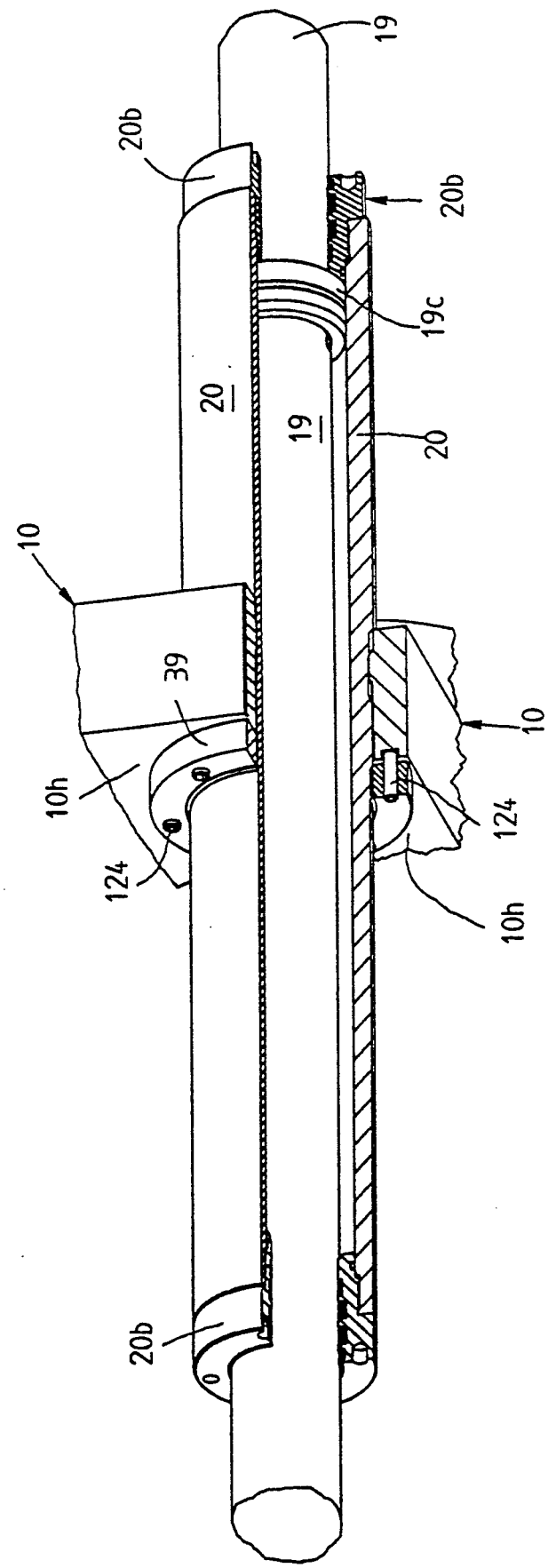
FIGS. 5 and 6 are perspective fragmentary views showing on a larger scale and partly in section details of the plasticizing and injecting unit of FIG. 4 adjacent to its hydraulic actuators.
Figure 6:
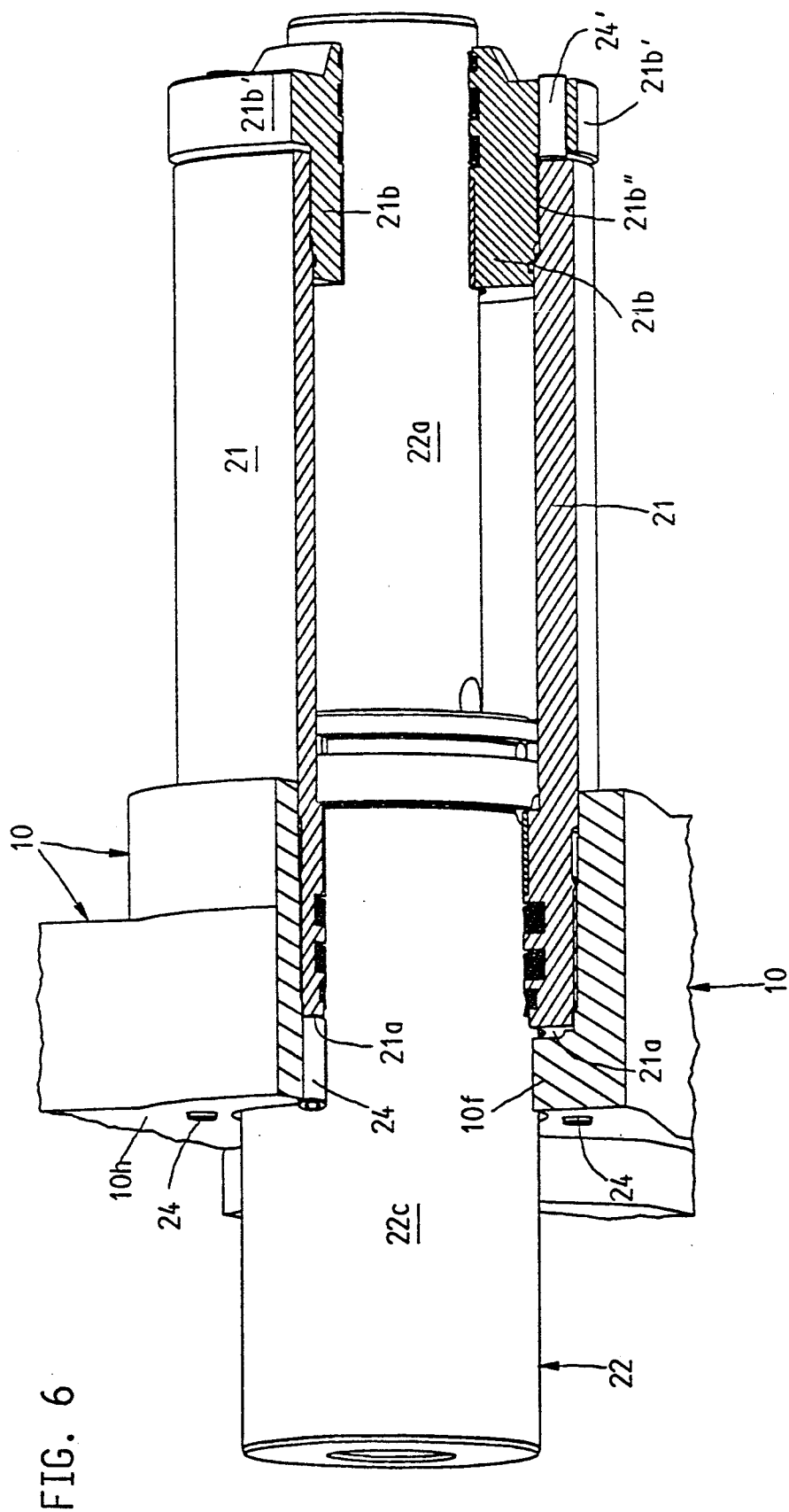
Figure 7:
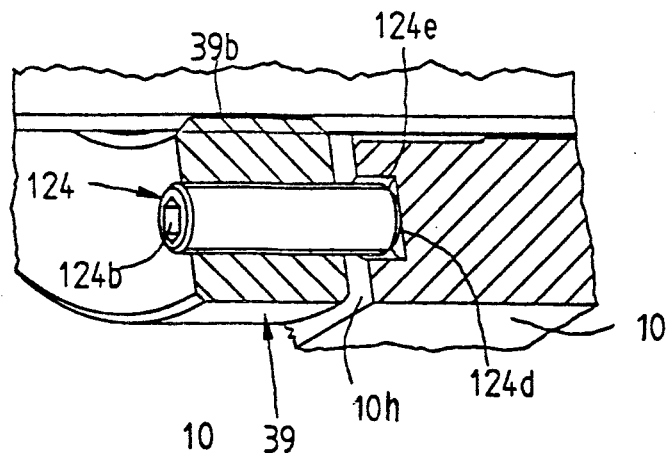
FIGS. 7 and 8 are enlarged fragmentary views showing details adjacent of FIGS. 5 and 6, respectively, adjacent to respective lock screws.
Figure 8:
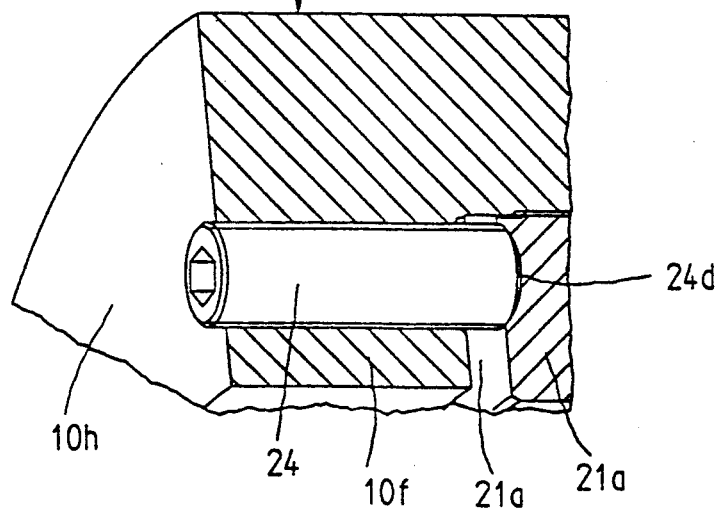
Figure 9:
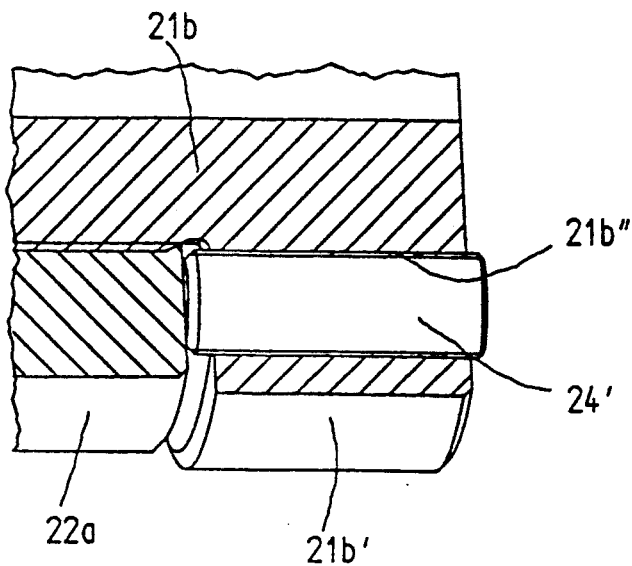
FIG. 9 is an enlarged fragmentary view showing a detail adjacent to the rear cylinder cover.

FIG. 4 shows a plasticizing and injecting unit which in the dimension of its components differs slightly from the plasticizing and injecting unit shown in FIGS. 1 to 3. But said differences are of no significance for the invention and its disclosure and for this reason will not be taken into account in the following description.

The carrier and supply block 10 has a central bore 12, which receives a plasticizing cylinder 17. The block 10 also comprises a plurality of tapped bores 14; 13, the axes of which are parallel to the injection axis s—s, which is the center line of the central bore 12. The bores 14; 13 contain hydraulic actuators A; E, which are approximately coaxial to the respective bores 14; 13 and comprise each a cylinders 20; or 21, which has external screw threads of the bores 14; or 13. Owing to their deviations from a coaxial arrangement there may be an angular misalignment of up to 2 degrees between the axis of each cylinder and the axis n—n; or m—m of the bores 14; or 13.

In the illustrative embodiment shown, the cylinders 20 of two hydraulic advance-retract actuators for axially displacing the plasticizing and injecting unit in the injection molding machine on axially fixed guide rods 19 are screwed into the internal screw threads of the bores 14 and the cylinders 21 of two hydraulic injecting actuators for axially displacing the feed screw are screwed into the internal screw threads of the bores 13, which are larger in inside diameter than the bores 14. As a result of a misaligning moment the actuators A; E deviate from a coaxial arrangement so that there is an angular misalignment between said axes of said actuators and the axes of the bores 14;13.

The means for locking the actuators A; E in the associated bores 14; 13 and for changing the angular misalignments comprise a plurality of lock screws 124; 24, which are mounted on a circle and extend approximately parallel to the injection axis s—s. By means of the lock screws 124; 24 the carrier and supply block and the cylinders 20; 21 mounted in said block can be biased in mutually opposite directions. The magnitude and initial distribution of that bias can be determined in that the several screws 124; 24 are selectively tightened and the magnitude and sense of the angular misalignments can thus arbitrarily be changed. The cylinders 20 of the advance-retract actuators for displacing the entire plasticizing and injecting unit extend entirely through the associated bores 14 and protrude from the carrier and supply block at its forward and rear ends. The associated screws 124 are screwed to a tapped ring 39, which has internal screw threads 39b interengaging with external screw threads of the cylinder 20. The lock screws 124 which are screwed to the tapped ring 39 have end edges 124d, which bear on the adjacent end face 10h of the carrier and supply block 10, which in said end face 10h has recesses 124e, in which the end edges 124a, 124d are received.

The cylinders 21 of the injection actuators E for axially displacing the feed screw have forward end portions, which are provided with external screw threads 21f and extend in the bores 13 in portions which are relatively large in diameter. The end face 21a of the cylinder 21 faces an internal flange 10f of the carrier and supply block 10. The lock screws 24 extend through the internal flange 10f and have external screw threads interengaging with internal screw threads of the internal flange 10f. The screw threads 24 have end edges 24d, which engage the end face 21a of the cylinder 21. The hydraulic advance-retract actuators A for axially displacing the plasticizing and injecting unit on the guide rods 19 are symmetrical to a plane e—e, which includes an angle to the horizontal. The same remark is applicable to the bores 13 for receiving the hydraulic injecting actuators E for axially displacing the feed screw; said bores 13 are symmetrical to a plane f—f. The pistons 19c of the actuators A are fixed to the axially fixed guide rods 19.

The embodiment shown by way of example comprises two hydraulic advance-retract actuators A for axially displacing the plasticizing and injecting unit on the guide rods 19 and two hydraulic injection actuators E for axially displacing the feed screw relative to the plasticizing cylinder 17. Said actuators A and E are received in bores 14; 13, which are formed in the carrier and supply block 10 and are symmetrical to the injection axis s—s. The injection actuators for axially displacing the feed screw are interconnected at their rear ends by a feed screw actuating bridge 25, which carries a rotary drive motor 26, which has an output shaft for rotating the feed screw. The center of gravity of the subassembly composed of the actuators E, the rotary drive motor 26, the output shaft 42 and the feed screw is spaced a relatively large distance from the region in which that subassembly is supported in the bores of the carrier and supply block 10 so that a substantial misaligning moment will act on the interengaging screw threads of the actuators E and the block 10.

An injecting piston 22 is disposed in the cylinder 21 of the actuator E and has a forward portion 22c, which is enlarged in diameter and protrudes forwardly of the end face 10h of the carrier and supply block 10. The injecting piston 22 has also a rear portion 22a, which is smaller in diameter and extends through a rear cylinder cover 21b, which has external screw threads 21b", which are screwed into internal screw threads of the cylinder 21. The cylinder cover 21b has a radial flange 21b', which contacts the rear end face of the cylinder 21 on a full circle. The cylinder covers 21b which are screwed to the cylinders 21 are locked by means of lock screws 24', which are screwed to the radial flange 21b' approximately on a circle so that it is possible to wedge the interengaging screw threads of the cylinder cover 21b and the cylinder 21 against each other in that the lock screws 24' are selectively tightened to provide an axial bias which varies around the cylinder 21. That tightening will be effected in small steps and by an exertion of relatively small torques. On the other hand, larger screwing implements would be required also for axially wedging the screw threads against each other by means of a tapped ring acting as a lock nut.

It is apparent form FIG. 4 that the plasticizing clyinder can be supported by means of supporting rollers 41 and may be laterally guided by means of guide rollers 41a. Said supporting and guiding rollers are mounted in protruding arms 29c of a stationary U-shaped yoke 29, which is mounted on a stationary pedestal 36 of the injection molding machine. The yoke 29 has vertical legs, which contain sleeves, which surround the guide rods 19.

As is particularly apparent from FIG. 2 in con with FIG. 3 the carrier and supply block 10 may also be provided with a protruding arm and may be supported on the pedestal 36 by means of said protruding arm and an interposed rolling element. The plasticizing cylinder is surrounded by a protective housing 23 and is adapted to be axially locked in the central bore formed in the carrier and supply block. The plastic material is supplied through a bore 11 in the carrier and supply block into the plasticizing cylinder.

I claim:

1. In a plasticizing and injecting unit for use in an injection molding machine, comprising
    a carrier and supply block, which has a first bore having a horizontal center line, which defines an injection axis, and at least one second bore, which is formed with internal screw threads, has an axis that is parallel to and spaced from said injection axis,
    a plasticizing cylinder, which is detachably mounted in said first bore,
    a cylindrical hydraulic advance-retract actuator, which has an axis and extends in said second bore and has external screw threads interengaging with said internal screw threads so as to permit said actuator to assume relative to said second bore a non-coaxial position involving an angular misalignment between the axes of said actuator and of said second bore, and
    locking means comprising screw means, which are screwable to wedge said internal and external screw threads against each other to fix said actuator in said carrier and supply block,
    the improvement residing in that
    Said screw means comprise a plurality of lock screws, which extend substantially parallel to said injection axis and are spaced apart approximately on a circle surrounding said axis of said second bore and are tightenable to selectively bias said carrier and supply block and said actuator in mutually opposite senses so that said angular misalignment can be controlled in its magnitude and direction.

2. The improvement set forth in claim 1, as applied to a plasticizing and injecting unit in which said actuator is arranged to be subjected to a misaligning moment tending to move said actuator to said non-coaxial position.

3. The improvement set forth in claim 1 as applied to a plasticizing and injecting unit in which said carrier and supply block has a plurality of second bores, each of which has internal screw threads and have respective axes which are parallel to and spaced around said injection axis and a plurality of said cylindrical hydraulic advance-retract actuators are provided, each of which extends in one of said second bores and is fixed to said carrier and supply block by said locking means,
    wherein said screw means comprise in association with each of said actuators a plurality of lock screws, which extend substantially parallel to said injection axis and are spaced apart approximately on a circle surrounding said axis of said second bore, containing said associated actuator and are selectively tightenable to selectively bias said carrier and supply block and the associated actuator in mutually opposite senses so that said angular misalignment can be controlled in its magnitude and direction.

4. The improvement set forth in claim 3 as applied to a plasticizing and injecting unit in which each of said actuators comprises a stationary piston and guide rod which is parallel to said injection axis, wherein each of said actuators comprises a cylinder that is formed with said external screw threads and slidably mounted on one of said piston and guide rods, and each of said actuators comprises forward and rear end portions axially protruding from said carrier and supply block on opposite sides.

5. The improvement set forth in claim 4, wherein each of said cylinders has an end portion axially protruding from said carrier and supply block and formed with additional external screw threads, said locking means comprise for each of said cylinders a tapped ring screwed on said additional external screw threads and said plurality of screws associated with each of said actuators are screwed to said tapped ring associated with said actuator and have each an end portion which axially protrudes from said tapped ring toward said carrier and supply block and in engagement with said carrier and supply block.

6. The improvement set forth in claim 2 as applied to a plasticizing and injecting unit that comprises a plurality of stationary guide rods extending through respective ones of said second bores and a feed screw actuating bridge which is axially slidably mounted on two of said guide rods, which extend through two of said second bores, wherein each of said two second bores has a first portion, which is adjacent to said bridge and relatively small in diameter, and a second portion, which is remote from said bridge and relatively large in diameter and formed with said internal screw threads, said carrier and supply block has internal flanges radially protruding into respective ones of said two second bores at that end of said second portion which is remote from said first portion, one of said actuators extends in each of said two bores and comprises an injecting piston, which is slidably mounted on one of said two guide rods and is connected to said feed screw actuating bridge, and a cylinder, which is slidably mounted on said piston and has an end portion which is formed with said external screw threads and has an end face facing said internal flange, and said plurality of lock screws associated with each of said two actuators are screwed into one of said internal flanges and have free ends engaging said end face of the associated cylinder.

7. The improvement set forth in claim 6, wherein each of said cylinders has opposite to said end face a second end face and is formed adjacent to said second end face with internal screw threads, two cylinder covers are provided, each of which has external screw threads screwed into said internal screw threads of one of said cylinders and comprises a radial flange covering said second end face of said cylinder on a full circle and each of said injecting pistons comprises a first portion, which is relatively large in diameter and axially protrudes from said carrier and supply block on the side thereof which is remote from said bridge, and a second portion, which is relatively small in diameter and extends through said cylinder cover.

8. The improvement set forth in claim 7, wherein each of said cylinders has an axis and each of said cylinder covers has an axis and is adapted to assume a non-coaxial position involving an angular misalignment between said axes of said cylinder and said radial flange, and a plurality of lock screws disposed approximately on a circular line are screwed to each of said radial flanges and are selectively tightenable to lock said cylinder cover and to bias said cylinder cover and the associated cylinder in mutually opposite senses so that said angular misalignment of said axes of said cylinder and of said radial flange can arbitrarily be changed.

9. The improvement set forth in claim 1, wherein said actuator has an end portion axially protruding form said carrier and supply block and formed with additional external screw threads, said locking means comprise a tapped ring screwed on said additional external screw threads, and said plurality of screws are screwed to said tapped ring and have each an end portion which axially protrudes from said tapped ring toward said carrier and supply block and in engagement with said carrier and supply block.

10. The improvement set forth in claim 9, wherein said carrier and supply block has an end face facing said tapped ring and formed with an annular series of recesses and said end portions of said screws engage said carrier and supply block in said recesses.

* * * * *